United States Patent
Ikenaka (10) Patent No.: US 7,710,847 B2
(45) Date of Patent: May 4, 2010

(54) OPTICAL PICKUP APPARATUS

(75) Inventor: Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 657 days.

(21) Appl. No.: 11/713,217

(22) Filed: Mar. 2, 2007

(65) Prior Publication Data

US 2007/0211604 A1 Sep. 13, 2007

(30) Foreign Application Priority Data

Mar. 7, 2006 (JP) ............................. 2006-061082

(51) Int. Cl.
G11B 7/00 (2006.01)

(52) U.S. Cl. ............................. 369/112.04; 369/112.07; 369/112.08; 369/121

(58) Field of Classification Search .................. None
See application file for complete search history.

(56) References Cited

U.S. PATENT DOCUMENTS

| 2004/0047269 | A1* | 3/2004 | Ikenaka et al. | 369/112.08 |
| 2005/0083562 | A1* | 4/2005 | Hendriks | 359/205 |
| 2005/0237898 | A1* | 10/2005 | Kimura | 369/112.05 |
| 2006/0016958 | A1* | 1/2006 | Ikenaka | 250/201.5 |

* cited by examiner

*Primary Examiner*—Paul Huber
(74) *Attorney, Agent, or Firm*—Cohen Pontani Lieberman & Pavane LLP (57) ABSTRACT

An optical pickup apparatus for recording and/or reproducing information for an optical information recording medium, comprising a light converging optical system including a coupling lens and an objective lens, wherein a first diffraction structure is installed on the objective lens, and a second diffraction structure is arranged on the coupling lens, whereby the spherical aberration and chromatic aberration caused by the difference in the thickness of the protective layer are corrected in the light converging optical system as a whole.

17 Claims, 1 Drawing Sheet

FIG. 1

OPTICAL PICKUP APPARATUS

This application is based on Japanese Patent Application No. 2006-691082 filed on Mar. 7, 2006, in Japanese Patent Office, the entire content of which is hereby incorporated by reference.

FIELD OF THE INVENTION

The present invention relates to an optical pickup apparatus, particularly an optical pickup apparatus capable of information recording and/or reproduction using different types of optical information recording media with compatibility maintained among these media.

BACKGROUND OF THE INVENTION

In recent years, there has been a rapid progress in the research and development of a high-density optical disk system capable of recording and/or reproduction (hereinafter referred to as "recording/reproduction) of information, using a blue-violet semiconductor laser having a wavelength of about 405 nm. For example, an optical disk for conducting information recording/reproduction based on NA of 0.85 and light source wavelength of 405 nm—a so-called Blu-ray Disc (hereinafter referred to as "BD")—is capable of recording 23 through 27 GB information per layer, as compared to the optical disk having a diameter of 12 cm, the same diameter as that of the DVD (NA: 0.6; light source wavelength: 650 nm, memory size: 4.7 GB). Further, an optical disk to conduct information recording/reproduction based on NA of 0.65 and light source wavelength of 405 nm—so-called HD DVD (hereinafter referred to as "HD")—is capable of recording 15 through 20 GB information per layer as compared to the optical disk having a diameter of 12 cm. When the BD is used, there is an increase in the coma aberration caused by the skew of the optical disk. In the present Specification, such an optical disk will be referred to as a "high-density optical disk".

The value of the optical disk player/recorder as a commercial product such as optical disk player or recorder (hereinafter referred to as "optical disk player/recorder) cannot be said to be sufficient in some cases if information recording/reproduction can be conducted only when a high-density optical disk is used. At present, since the DVD and CD (compact disks) for recording a great variety of information are put on the market, the commercial value of the optical disk player/recorder for high density optical disk is enhanced if adequate information recording/reproduction capacity is ensured for the DVD and CD owned by the user, for example. Thus, the optical pickup apparatus mounted on the optical disk player/recorder for high-density optical disk is desired to ensure adequate information recording/reproduction for any of the high-density optical disk, DVD and CD.

A method has been proposed to permit adequate information recording and/or reproduction while maintaining compatibility with any of the high-density optical disk, DVD and CD. According to this method, selective switching is carried out between the optical system for high-density optical disk and the optical system for DVD and CD in response to the recording density of the optical disk for information recording and/or reproduction. However, this method requires a plurality of optical systems, and is disadvantageous from the viewpoint of downsizing and cost cutting.

To simplify the structure of the optical pickup apparatus and to reduce the cost, it is preferred in the optical pickup apparatus characterized by compatibility that standardization should be achieved between the optical system for high-density optical disk and the optical system for the DVD and CD wherever possible, thereby minimizing the number of the optical parts constituting the optical pickup apparatus. Further, standardization of the objective optical system laid opposite to the optical disk is the shortest way to simplify the structure of the optical pickup apparatus and to reduce the cost.

The Patent Document 1 discloses an optical pickup apparatus wherein a diffraction structure is employed to maintain compatibility between a DVD and CD in information recording and/or reproduction.

[Patent Document 1] Unexamined Japanese Patent Application Publication No. 2005-141800

However, the optical pickup apparatus of the Patent Document 1 fails to provide adequate compatibility between the high-density optical disk and DVD in information recording and/or reproduction. The thicknesses of protective layer and the wavelength in the optical disks intended for compatible use are different between the high-density optical disk and DVD, and between the DVD and CD. This makes it difficult to ensure compatibility in use and correction of chromatic aberration cannot be ensured.

The following specifically describes the compatibility in use: The objective lens and collimator in the Patent Document 1 is provided with a diffraction structure for emitting the diffracted light highly efficient for the light of the DVD and CD waveforms. When the light of a high-density optical disk has entered, highly efficient diffracted light is emitted. However, since the diffracted light enters the objective lens at the angle of divergence almost the same as that of the CD wavelength light, the objective lens excessively corrects the spherical aberration generated by the thickness of the protective layer of the high-density optical disk. This arrangement fails to achieve the compatibility in use. Further, the following problem is found in the correction of chromatic aberration. In the refractive objective lens, the light of the high-density optical disk wavelength has a chromatic aberration 2.5 through 3.5 times greater than that of the CD wavelength. Thus, in the optical system optimized to the light of CD wavelength, chromatic aberration remains uncorrected.

SUMMARY OF THE INVENTION

The object of the present invention is to solve the problems of the conventional art and to provide an optical pickup apparatus capable of information recording and/or reproduction compatibly using different types of optical information recording media with compatibility maintained among these media.

According to the first aspect of the present invention, there is provided an optical pickup apparatus comprising: a first light source for emitting a first light flux having a wavelength $\lambda 1$ (nm); a second light source for emitting a second light flux having a wavelength $\lambda 2$ (nm) ($\lambda 2 > \lambda 1$); and a light converging optical system including a coupling lens and an objective lens, wherein the light converging system converges a light flux from the first light source onto an information recording surface of a first optical information recording medium through a protective layer having a thickness t1 so that recording and/or reproducing information is conducted for the first optical information recording medium, and converges a light flux from the second light source onto an information recording surface of a second optical information recording medium through a protective layer having a thickness t2 ($t1 \leq t2$) so that recording and/or reproducing information is conducted for the second optical information recording medium, wherein the first light source and the second light source are arranged so that a distance between the first light source and the coupling lens become optically equal to a distance between the second light source and the coupling lens, wherein a first diffraction structure is provided on an optical surface of the objective lens through which both the light flux of the wavelength λ1 and that of the wavelength λ2 pass, wherein the following equation (1) is satisfied when d1 denotes an average depth of step structures in the optical axial direction of the first diffraction structure, wherein the following equation (2) is satisfied by the chromatic aberration ΔfB of the composite system including the objective lens and coupling lens with respect to the light flux of the wavelength λ1, wherein a second diffraction structure is formed on an optical surface of the coupling lens through which both the light flux of the wavelength λ1 and that of the wavelength λ2 pass, and wherein the following equation (3) is satisfied when d2 denotes the average depth of step structures in the optical axial direction of the second diffraction structure:

$$\lambda 1 \times 2/(n1-1) \times 1.0 \leq d1 \text{ (nm)} \leq \lambda 1 \times 2/(n1-1) \times 1.3 \quad (1)$$

$$-0.4 \leq \Delta fB \text{ (}\mu m/nm\text{)} + 1.29 \times 10^{-4} \times f1 \times (m2-m1) \leq 0.1 \quad (2)$$

$$\lambda 1 \times 2/(n2-1) \times 1.0 \leq d2 \text{ (nm)} \leq \lambda 1 \times 2/(n2-1) \times 1.3 \quad (3)$$

where m1 denotes the magnification of the objective lens at the time of recording or reproduction of information using the first optical information recording medium;

f1 indicates the focal distance of the objective lens at the time of recording or reproduction of information using the first optical information recording medium;

m2 shows the magnification of the objective lens at the time of recording or reproduction of information using the second optical information recording medium;

n1 represents the refractive index of the material constituting the first diffraction structure with respect to the light of wavelength λ1; and n2 represents the refractive index of the material constituting the second diffraction structure with respect to the light of wavelength λ1.

The present invention uses a diffraction structure to ensure compatibility between the first optical information recording medium and the second optical information recording medium. In this case, the problem is where to install the diffraction structure. The NA of the objective lens is generally greater than that of the coupling lens. Accordingly, if the diffraction structure for correcting the spherical aberration and the chromatic aberration resulting from the difference in the thickness of the protective layer is installed on the optical surface of the objective lens, there is concern about the forming property of the diffraction structure because there is a large visual angle of the lens surface on the end of effective diameter having the smallest pitch. By contrast, the coupling lens has a smaller NA. Thus, the problem is that only the chromatic aberration can be corrected, even if a diffraction structure is arranged on the optical surface thereof.

In the present invention, a first diffraction structure is installed on the objective lens, and a second diffraction structure is arranged on the coupling lens, whereby the spherical aberration and chromatic aberration caused by the difference in the thickness of the protective layer are corrected in the light converging optical system as a whole.

To put it more specifically, the first light source and second light source are placed at positions optically equal distance from the objective lens. Then the optical magnification m1 of the objective lens on the light flux of wavelength λ1 and optical magnification m2 of the objective lens on the light flux of wavelength λ2 are determined so as to achieve compatibility. Then, based on this determination, the specifications of the second diffraction structure of the coupling lens can be determined. The chromatic aberration of the entire optical system is determined by the concept of the optical pickup apparatus such as usage of recording or reproduction alone. Further, if the specifications on the design value of the second diffraction structure are determined, the specifications of the first diffraction structure of the objective lens can be determined in such a way so as to satisfy the equation (2). As described above, if the chromatic aberration of the objective lens is corrected, the chromatic aberration of that composite system is corrected, even if the chromatic aberration remains on the coupling lens. The spherical aberration and chromatic aberration caused by the difference in the thickness of the protective layer can be adequately corrected in the light converging optical system as a whole. It has been found out that the chromatic aberration of the objective lens is inversely proportional to the chromatic aberration of the coupling lens. The amount of chromatic aberration refers to the amount of displacement of the best defocus when there is a change of 1 nm in the wavelength of the light source.

Further, if the first diffraction structure and second diffraction structure are designed so as to satisfy the equations (1) and (3), the intensity of the secondary diffracted light is maximized in the light flux of the wavelength λ1 and the intensity of the primary diffracted light is maximized in the light flux of the wavelength λ2, regardless of which of the diffraction structures has been passed through by light. Thus, the utilization efficiency of light can be enhanced by using the diffracted light of lower order. The average step depth d1 is defined as the average value of the step depths of diffraction structures formed in the area through which both the wavelengths λ1 and λ2 pass, in the objective lens. Namely, it corresponds to the value obtained by dividing the total of the depth of the step formed in this area, by the number of steps. When a third light source of the wavelength λ3 is provided, the average step depth d1 is defined as the average value of the step depths diffraction structures formed in the area through which all of the wavelengths λ1, λ2 and λ3 pass, in the objective lens. The average step depth d2 is defined as the average value of the step depths of diffraction structures formed in the area through which both the wavelengths λ1 and λ2 pass, in the coupling lens. Namely, it corresponds to the value obtained by dividing the total of the depth of the step formed in this area, by the number of steps. Even when the third light source of the wavelength λ3 is provided, the average step depth d2 is defined as the average value of the step depths of diffraction structures formed in the area through which both the wavelengths λ1 and λ2 pass, in the objective lens. Namely, it corresponds to the value obtained by dividing the total of the depth of the step formed in this area, by the number of steps.

According to the second aspect of the present invention, there is provided the optical pickup apparatus of the first aspect of the present invention, that satisfies the following equation, and therefore, both the first and second diffraction structures is designed in a structure with a smaller number of strap, whereby the loss of light passing through the diffraction structure is reduced.

$$-0.02 < m2 - m1 < 0 \quad (4)$$

According to the third aspect of the present invention, there is provided the optical pickup apparatus of the first aspect of the present invention, wherein the light flux reflected from the information recording surface of the first optical information recording medium and the light flux reflected from the information recording surface of the second optical information recording medium enter the light receiving surface of a common optical detector. Therefore, compact configuration of the optical pickup apparatus is achieved by use of the common optical detector.

According to the fourth aspect of the present invention, there is provided the optical pickup apparatus of the first aspect of the present invention, wherein the following equation is satisfied, and therefore, the effect of correcting the chromatic aberration can be enhanced when the first optical information recording medium is used.

$$-\frac{1}{6} \leq mG \leq -\frac{1}{10} \qquad (5)$$

wherein mG denotes the magnification of the composite system made up of the objective lens and coupling lens at the time of information recording or reproduction using the first optical information recording medium.

According to the fifth aspect of the present invention, there is provided the optical pickup apparatus of the first aspect of the present invention, wherein the first and second light sources are accommodated in a common package, thereby permitting further downsizing of the optical pickup apparatus.

According to the sixth aspect of the present invention, there is provided the optical pickup apparatus of the first aspect of the present invention, wherein a third light source of wavelength $\lambda 3$ ($\lambda 2 < \lambda 3$) is further provided, and the light converging optical system converges a light flux from the third light source onto an information recording surface of a third optical information recording medium through a protective layer having a thickness t3 (t2<t3), whereby information recording and/or reproduction is enabled.

In the present specification, if there are a lens capable of light convergence arranged opposite the optical information recording medium at the position closest to this recording medium mounted on the optical pickup apparatus; and an optical element or lens which is mounted on an actuator for driving the lens and is driven integrally with the lens for light convergence, then the objective lens is defined as the optical element group including the optical element or lens. In other words, the objective lens can be made up of a plurality of lenses although it is preferably made up of a single lens.

The present invention provides an optical pickup apparatus capable of information recording and/or reproduction using different types of optical information recording media with compatibility maintained among these media.

DETAILED DESCRIPTION OF THE PREFERRED EMBODIMENTS

Figure 1:
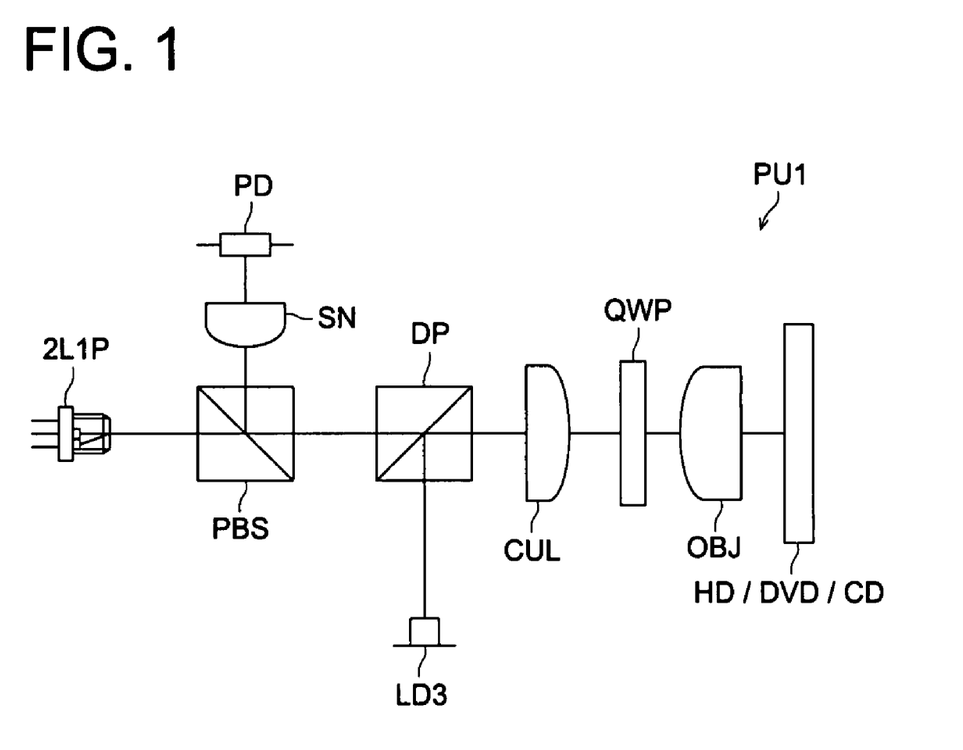
FIG. 1 is a drawing schematically representing the structure of an optical pickup apparatus PU1 of the present embodiment capable of correct information recording/reproduction using an HD, DVD and CD as different types of optical information recording media (also called the optical disks).

The following describes the embodiment of the present invention with reference to drawings: FIG. 1 is a drawing schematically representing the structure of an optical pickup apparatus PU1 of the present embodiment capable of correct information recording/reproduction using an HD, DVD and CD as different types of optical information recording media (also called the optical disks). This optical pickup apparatus PU1 can be mounted on an optical information recording/reproduction apparatus.

The optical pickup apparatus PU1 includes:
a 2-laser 1-package 2L1P wherein a common package located equidistant from the objective lens accommodates:
a first semiconductor laser for emitting the blue-violet laser light flux (the first light flux) of $\lambda 1 = 407$ nm, wherein light is emitted at the time of information recording/reproduction using the HD as a high-density optical disk; and
a second semiconductor laser for emitting the red laser light flux (the second light flux) of $\lambda 2 = 655$ nm, wherein light is emitted at the time of information recording/reproduction using the DVD;
a CD hologram laser LD3 integrally containing a third semiconductor laser (third light source) for emitting infrared laser light flux (third light flux) of $\lambda 3 = 785$ nm, wherein light is emitted at the time of information recording/reproduction using the CD; and a CD optical detector;
an optical detector PD shared by an HD and DVD;
a coupling lens (also called the outgoing angle conversion element, the same hereafter) CUL, wherein a diffraction structure is formed;
an objective lens OBJ capable of converging the incoming laser light flux on the information recording surface of the optical disk;
a polarized beam splitter (also called the separation unit, the same hereafter) PBS;
a dichroic prism DP (or a half-mirror);
a $\lambda/4$ wave plate QWP; and
a sensor lens SN for providing astigmatism to the light flux reflected by the optical disk.

The optical surfaces of the coupling lens CUL and objective lens OBJ are provided with the diffraction structures, wherein the amount of the secondary diffracted light is maximized when the light flux of wavelength $\lambda 1$ has passed by, and the amount of the primary diffracted light is maximized when the light flux of wavelengths $\lambda 2$ and $\lambda 3$ has passed by. In addition to the semiconductor laser LD1, a blue-violet SHG laser can be used as a light source for HD.

In the optical pickup apparatus PU1, light is emitted from the first semiconductor laser (also called the first light source, the same hereinafter) of the 2-laser 1-package 2L1P at the time of information recording/reproduction using the HD. The divergent light flux emitted from the first semiconductor laser passes through the polarized beam splitter PBS and dichroic prism DP, and is converted into the finite convergent light flux of convergent angle θ1 by the coupling lens CUL. Then this light passes through the $\lambda/4$ wave plate QWP. After the diameter of the light flux has been controlled by an aperture (not illustrated), the objective lens OBJ causes the light to form a spot on the information recording surface through the HD protective layer. The objective lens OBJ conducts focusing and tracking through the biaxial actuator (not illustrated) arranged on the periphery.

The reflected light flux having been modulated by the information pit on the information recording surface of the HD again passes through the objective lens OBJ and $\lambda/4$ wave plate QWP. After passing through the coupling lens CUL and dichroic prism DP, the light is reflected by the polarized beam splitter PBS and is provided with astigmatism by the sensor lens SN. Then the light is converged on the light receiving surface of the optical detector PD. Then the information recorded on the HD can be read using the output signal of the optical detector PD.

In the optical pickup apparatus PU1, at the time of information recording/reproduction using the DVD, light is emitted from the second semiconductor laser (also called the second light source, the same hereafter) of the 2-laser 1-package 2L1P. The divergent light flux emitted from the second semiconductor laser passes through the polarized beam splitter PBS and dichroic prism DP, and is converted into the finite converged light flux or infinite light flux or finite divergent light flux of convergent angle θ2 (θ1 ≠θ2) by the coupling lens CUL. The light flux then passes through the λ/4 wave plate QWP. After the diameter of the light flux has been controlled by an aperture (not illustrated), the objective lens OBJ causes the light to form a spot on the information recording surface through the protective layer of the DVD. The objective lens OBJ conducts focusing and tracking through the biaxial actuator (not illustrated) arranged on the periphery.

The reflected light flux having been modulated by the information pit on the information recording surface of the DVD again passes through the objective lens OBJ and λ/4 wave plate QWP. After passing through the coupling lens CUL and dichroic prism DP, the light is reflected by the polarized beam splitter PBS and is provided with astigmatism by the sensor lens SN. Then the light is converged on the light receiving surface of the optical detector PD. Then the information recorded on the DVD can be read using the output signal of the optical detector PD.

In the optical pickup apparatus PU1, at the time of information recording/reproduction using the DVD, light is emitted from the hologram laser LD3. The divergent light flux from the hologram laser LD3 is reflected by the dichroic prism DP, and is converted into the finite divergent light flux having an angle of divergence of θ3 by the coupling lens CUL. The light flux then passes through the λ/4 wave plate QWP. After the diameter of the light flux has been controlled by an aperture (not illustrated), the objective lens OBJ causes the light to form a spot on the information recording surface through the protective layer of the DVD. The objective lens OBJ conducts focusing and tracking through the biaxial actuator (not illustrated) arranged on the periphery.

The reflected light flux having been modulated by the information pit on the information recording surface of the CD again passes through the objective lens OBJ and λ/4 wave plate QWP, and is reflected by the coupling lens CUL and dichroic prism DP. Then the light is converged on the light receiving surface of the optical detector inside the hologram laser LD3. Then the information recorded on the CD can be read using the output signal of the optical detector.

EXAMPLE

The following describes the preferred example of the embodiment. In the following description (including the lens data), the power multiplier of 10 (e.g., $2.5 \times 10^{-3}$) will be expressed in terms of E (e.g., 2.5E−3).

The optical surface of the objective optical system is formed on the axially symmetric aspherical surface around the optical axis, defined by the mathematical expression obtained by substituting the coefficient of the Table into the mathematical formula 1.

$$z = (y^2/\gamma)/[1+\sqrt{\{1-(K+1)(y/\gamma)^2\}}] + A_4 y^4 + A_6 y^6 + A_8 y^8 + A_{10} y^{10} + A_{12} y^{12} + A_{14} y^{14} + A_{16} y^{16} + A_{18} y^{18} + A_{20} y^{20}$$ [Mathematical Formula 1]

z: Shape of aspherical surface (distance along the optical axis from the plane surface bordering on the vertex of surface of a aspherical surface)

y: Distance from optical axis

γ: Curvature radius

K: Cornic coefficient $A_4, A_6, A_8, A_{10}, A_{12}, A_{14}, A_{16}, A_{18}, A_{20}$: Aspherical surface coefficient The difference in optical path applied to the light flux of each wavelength by the diffraction structure (phase structure) is defined by the mathematical expression obtained by substituting the coefficient of the Table into the function of optical path difference of the mathematical formula 2.

$$\phi = dor \times \lambda/\lambda_B \times (C_2 y^2 + C_4 y^4 + C_6 y^6 + C_8 y^8 + C_{10} y^{10})$$ [Mathematical Formula 2]

where

φ: Function of optical path difference

λ: Wavelength of light flux entering the diffracted structure $\lambda_B$: Blaze wavelength dor: Order of diffraction of the diffracted light for recording/reproduction using the optical disk y: Distance from optical axis $C_2, C_4, C_6, C_8, C_{10}$: Optical path difference function coefficient Example 1

Table 1 shows the lens data of Example 1, wherein the optical magnification m1 in the light flux of wavelength λ1 is 0.035, and the optical magnification m2 in the light flux of wavelength λ2 is 0.035, and therefore, the difference is zero. In this case, the chromatic aberration ΔfB (λm/nm) in the composite system made up of a coupling lens and objective lens is −0.12.

TABLE 1

Example 1

| i-th surface | ri | di (407 nm) | ni (407 nm) | di (655 nm) | ni (655 nm) | di (785 nm) | ni (785 nm) |
|---|---|---|---|---|---|---|---|
| 0 | | 0.00 | | 0.00 | | 0.00 | |
| 1 | ∞ | 29.21 | | 29.21 | | 18.21 | |
| 2 | 35.7364 | 1.70 | 1.5598 | 1.70 | 1.5407 | 1.70 | 1.5372 |
| 3 | −16.1301 | 10.00 | 1.0 | 10.00 | 1.0 | 10.00 | 1.0 |
| 4 | ∞ | 0.00 | | −0.17 | | 0.08 | |
| 5 (Aperture diameter) | ∞ | 0.00 | | 0.00 | | 0.00 | |
| 6 | 2.1231 | 1.76 | 1.5598 | 1.76 | 1.5407 | 1.76 | 1.5372 |
| 7 | −26.7426 | 1.54 | 1.0 | 1.71 | 1.0 | 1.46 | 1.0 |
| 8 | ∞ | 0.60 | 1.6187 | 0.60 | 1.5775 | 1.20 | 1.6187 |
| 9 | ∞ | 0.00 | 1.0 | 0.00 | 1.0 | 0.00 | 1.0 |

* di indicates the displacement from the i-th surface to the i + 1-th surface

TABLE 1-continued

| | 3rd surface Aspherical surface coefficient |
|---|---|
| κ | −1.0002E+00 |
| A4 | 1.9416E−05 |
| A6 | 0.0000E+00 |
| | 6th surface Aspherical surface coefficient |
| κ | −4.9315E−01 |
| A4 | 1.6515E−03 |
| A6 | 5.5701E−04 |
| A8 | −9.3443E−06 |
| A10 | −3.0976E−05 |
| A12 | 1.1487E−05 |
| A14 | −1.3823E−06 |
| | 7th surface Aspherical surface coefficient |
| κ | −1.9917E+01 |
| A4 | 1.0542E−02 |
| A6 | −1.4002E−03 |
| A8 | −1.6501E−04 |
| A10 | 7.2173E−05 |
| A12 | −1.0340E−05 |
| A14 | 6.3473E−07 |
| | Optical path difference function (HD DVD secondary, DVD: primary, CD: primary) |
| λB | 407 nm |
| C2 | −1.4955E−03 |
| | Optical path difference function (HD DVD secondary, DVD: primary, CD: primary) |
| λB | 395 nm |
| C2 | −1.0985E−02 |
| C4 | −3.4938E−04 |
| C6 | 8.3919E−05 |
| C8 | −3.9176E−05 |
| C10 | 4.3351E−06 |

Example 2

Table 2 shows the lens data of Example 2, wherein the optical magnification m1 in the light flux of wavelength λ1 is 0.045, and the optical magnification m2 in the light flux of wavelength λ2 is 0.026, and Therefore, the difference is 0.019. In this case, the chromatic aberration ΔfB (μm/nm) in the composite system made up of a coupling lens and objective lens is 0.06.

TABLE 2

Example 2

| i-th surface | ri | di (408 nm) | ni (408 nm) | di (660 nm) | ni (660 nm) | di (784 nm) | ni (784 nm) |
|---|---|---|---|---|---|---|---|
| 0 | | 0.00 | | 0.00 | | 0.00 | |
| 1 | ∞ | 18.08 | | 18.08 | | 11.47 | |
| 2 | 46.2814 | 1.00 | 1.5583 | 1.00 | 1.5392 | 1.00 | 1.5359 |
| 3 | −18.4386 | 10.00 | 1.0 | 10.00 | 1.0 | 10.00 | 1.0 |
| 4 | ∞ | 0.00 | | −0.10 | | 0.13 | |
| 5 (Aperture diameter) | ∞ | 0.00 | | 0.00 | | 0.00 | |
| 6 | 1.4188 | 1.37 | 1.5583 | 1.37 | 1.5392 | 1.37 | 1.5359 |
| 7 | −8.0337 | 1.04 | 1.0 | 1.14 | 1.0 | 0.91 | 1.0 |
| 8 | ∞ | 0.60 | 1.6183 | 0.60 | 1.5772 | 1.20 | 1.5707 |
| 9 | ∞ | 0.00 | 1.0 | 0.00 | 1.0 | 0.00 | 1.0 |

* di indicates the displacement from the i-th surface to the i + 1-th surface

TABLE 2-continued

|  | 3rd surface Aspherical surface coefficient |
|---|---|
| κ | −9.9948E−01 |
| A4 | 3.2017E−05 |
| A6 | 0.0000E+00 |
|  | 6th surface Aspherical surface coefficient |
| κ | −5.3111E−01 |
| A4 | 1.8302E−03 |
| A6 | 1.9628E−03 |
| A8 | 7.2388E−04 |
| A10 | −1.7748E−03 |
| A12 | 1.0782E−03 |
| A14 | −2.6515E−04 |
|  | 7th surface Aspherical surface coefficient |
| κ | −3.0573E+01 |
| A4 | 2.7016E−02 |
| A6 | −7.8590E−03 |
| A8 | −2.2641E−05 |
| A10 | −8.4844E−04 |
| A12 | 5.6544E−04 |
| A14 | −9.8702E−05 |
|  | Optical path difference function (HD DVD secondary, DVD: primary, CD: primary) |
| λB | 407 nm |
| C2 | 7.1665E−03 |
|  | Optical path difference function (HD DVD secondary, DVD: primary, CD: primary) |
| λE | 395 nm |
| C2 | 1.0763E−03 |
| C4 | −4.9838E−04 |
| C6 | 6.5400E−04 |
| C8 | −5.0621E−04 |
| C10 | 1.2263E−04 |

Example 3

Table 3 shows the lens data of Example 3, wherein the optical magnification m1 in the light flux of wavelength λ1 is 0.045, and the optical magnification m2 in the light flux of wavelength λ2 is 0.048, and Therefore, the difference is 0.003. In this case, the chromatic aberration ΔfB (μm/nm) in the composite system made up of a coupling lens and objective lens is −0.11.

TABLE 3

Example 3

| i-th surface | ri | di (408 nm) | ni (408 nm) | di (660 nm) | ni (660 nm) | di (784 nm) | ni (784 nm) |
|---|---|---|---|---|---|---|---|
| 0 |  | 0.00 |  | 0.00 |  | 80.43 |  |
| 1 | ∞ | 18.23 |  | 18.23 |  | 0.00 |  |
| 2 | 21.5799 | 1.00 | 1.5583 | 1.00 | 1.5392 | 0.00 |  |
| 3 | −9.1747 | 10.00 | 1.0 | 10.00 | 1.0 | 0.00 |  |
| 4 | ∞ | 0.00 |  | −0.11 |  | 0.00 |  |
| 5 (Aperture diameter) | ∞ | 0.00 |  | 0.00 |  | 0.00 |  |
| 6 | 1.6267 | 1.37 | 1.5583 | 1.37 | 1.5392 | 1.37 | 1.5359 |
| 7 | −18.5764 | 0.99 | 1.0 | 1.10 | 1.0 | 0.85 | 1.0 |
| 8 | ∞ | 0.60 | 1.6183 | 0.60 | 1.5772 | 1.20 | 1.5707 |
| 9 | ∞ | 0.00 | 1.0 | 0.00 | 1.0 | 0.00 | 1.0 |

* di indicates the displacement from the i-th surface to the i + 1-th surface

TABLE 3-continued

3rd surface
Aspherical surface coefficient

| | |
|---|---|
| κ | −9.9968E−01 |
| A4 | 8.6105E−05 |
| A6 | 0.0000E+00 |

6th surface
Aspherical surface coefficient

| | |
|---|---|
| κ | −5.0383E−01 |
| A4 | 3.5417E−03 |
| A6 | 2.9664E−03 |
| A8 | 4.9806E−04 |
| A10 | −1.8035E−03 |
| A12 | 1.0468E−03 |
| A14 | −2.3726E−04 |

7th surface
Aspherical surface coefficient

| | |
|---|---|
| κ | −1.3473E+00 |
| A4 | 2.5969E−02 |
| A6 | −1.1096E−02 |
| A8 | 3.6532E−03 |
| A10 | −3.3370E−03 |
| A12 | 1.3039E−03 |
| A14 | −1.7821E−04 |

Optical path
difference function
(HD DVD secondary,
DVD: primary)

| | |
|---|---|
| λB | 407 nm |
| C2 | −3.8522E−03 |

Optical path
difference function
(HD DVD secondary,
DVD: primary,
CD: primary)

| | |
|---|---|
| λB | 395 nm |
| C2 | −1.7549E−02 |
| C4 | −1.3939E−03 |
| C6 | 8.3469E−04 |
| C8 | −5.8599E−04 |
| C10 | 1.1907E−04 |

Example 4

Table 4 shows the lens data of Example 4, wherein the optical magnification m1 in the light flux of wavelength λ1 is 0.035, and the optical magnification m2 in the light flux of wavelength λ2 is 0.027, and therefore, the difference is 0.008. In this case, the chromatic aberration ΔfB (μm/nm) in the composite system made up of a coupling lens and objective lens is 0.03.

TABLE 4

Example 4

| i-th surface | ri | di (407 nm) | ni (407 nm) | di (655 nm) | ni (655 nm) | di (785 nm) | ni (785 nm) |
|---|---|---|---|---|---|---|---|
| 0 | | 0.00 | | 0.00 | | 114.63 | |
| 1 | ∞ | 29.18 | | 29.18 | | 0.00 | |
| 2 | 39.7962 | 1.70 | 1.5598 | 1.70 | 1.5407 | 0.00 | |
| 3 | −23.4207 | 10.00 | 1.0 | 10.00 | 1.0 | 0.00 | |
| 4 | ∞ | 0.00 | | −0.14 | | 0.00 | |
| 5 (Aperture diameter) | ∞ | 0.00 | | 0.00 | | 0.00 | |
| 6 | 2.0243 | 1.76 | 1.5598 | 1.76 | 1.5407 | 1.76 | 1.5372 |
| 7 | −16.9457 | 1.57 | 1.0 | 1.71 | 1.0 | 1.49 | 1.0 |
| 8 | ∞ | 0.60 | 1.6187 | 0.60 | 1.5775 | 1.20 | 1.6187 |
| 9 | ∞ | 0.00 | 1.0 | 0.00 | 1.0 | 0.00 | 1.0 |

* di indicates the displacement from the i-th surface to the i + 1-th surface

TABLE 4-continued

|  |  |
|---|---|
| 3rd surface Aspherical surface coefficient | |
| κ | 5.0842E−01 |
| A4 | 3.1889E−05 |
| A6 | 0.0000E+00 |
| 6th surface Aspherical surface coefficient | |
| κ | −5.1670E−01 |
| A4 | 4.4448E−04 |
| A6 | 1.1441E−03 |
| A8 | −1.4612E−04 |
| A10 | −5.3029E−05 |
| A12 | 2.3494E−05 |
| A14 | −3.2223E−06 |
| 7th surface Aspherical surface coefficient | |
| κ | −8.5805E+01 |
| A4 | 8.8415E−03 |
| A6 | −8.6964E−04 |
| A8 | −4.2338E−04 |
| A10 | 9.4844E−05 |
| A12 | −6.6661E−06 |
| A14 | −7.4638E−09 |
| Optical path difference function (HD DVD secondary, DVD: primary) | |
| $\lambda B$ | 407 nm |
| C2 | 1.5984E−03 |
| Optical path difference function (HD DVD secondary, DVD: primary, CD: primary) | |
| $\lambda B$ | 395 nm |
| C2 | −5.8764E−03 |
| C4 | −4.9147E−04 |
| C6 | 2.9116E−04 |
| C8 | −1.0284E−04 |
| C10 | 1.2038E−05 |

Table 5 summarizes the numerical values given in the examples.

TABLE 5

|  |  |  | Example 1 | Example 2 | Example 3 | Example 4 |
|---|---|---|---|---|---|---|
| HD | Composite system | Magnification (mG) | −0.112 | −0.143 | −0.143 | −0.112 |
|  |  | Chromatic aberration (ΔfB) [μm/nm] | −0.12 | 0.06 | −0.11 | 0.03 |
|  | Coupling | Focal distance [mm] | 22.8 | 14.2 | 14.2 | 22.8 |
|  | Objective | Focal distance (f1) [mm] | 3.10 | 2.30 | 2.30 | 3.10 |
|  |  | NA | 0.65 | 0.65 | 0.65 | 0.65 |
|  |  | Magnification (m1) | 0.035 | 0.045 | 0.045 | 0.035 |
|  |  | Chromatic aberration [μm/nm] | −0.42 | 0.48 | −0.49 | 0.08 |
| DVD | Composite system | Magnification (mG) | −0.118 | −0.138 | −0.151 | −0.115 |
|  | Coupling | Focal distance [mm] | 23.1 | 15.7 | 14.2 | 24.2 |
|  | Objective | Focal distance [mm] | 3.28 | 2.37 | 2.44 | 3.25 |
|  |  | NA | 0.65 | 0.65 | 0.65 | 0.65 |

TABLE 5-continued

|  | Example 1 | Example 2 | Example 3 | Example 4 |
|---|---|---|---|---|
| Magnification (m2) | 0.035 | 0.026 | 0.048 | 0.027 |
| $\Delta fB + 1.29 \times 10^{-4} \times f1 \times (m2 - m1)$ | −0.120 | 0.060 | −0.110 | 0.030 |
| d1 [mm] (Objective lens) | 0.00149 | 0.00152 | 0.00157 | 0.00149 |
| d2 [mm] (Coupling lens) | 0.00145 | 0.00141 | 0.00146 | 0.00145 |

What is claimed is:

1. An optical pickup apparatus comprising:
a first light source for emitting a first light flux having a wavelength $\lambda 1$ (nm);
a second light source for emitting a second light flux having a wavelength $\lambda 2$ (nm) ($\lambda 2 > \lambda 1$); and
a light converging optical system including a coupling lens and an objective lens,
wherein the light converging system converges a light flux from the first light source onto an information recording surface of a first optical information recording medium through a protective layer having a thickness t1 so that recording and/or reproducing information is conducted for the first optical information recording medium, and converges a light flux from the second light source onto an information recording surface of a second optical information recording medium through a protective layer having a thickness t2 (t1≦t2) so that recording and/or reproducing information is conducted for the second optical information recording medium,
wherein the first light source and the second light source are arranged so that a distance between the first light source and the coupling lens become optically equal to a distance between the second light source and the coupling lens,
wherein a first diffraction structure is provided on an optical surface of the objective lens through which both the light flux of the wavelength $\lambda 1$ and that of the wavelength $\lambda 2$ pass,
wherein the following equation (1) is satisfied when d1 denotes an average depth of step structures in the optical axial direction of the first diffraction structure,
wherein the following equation (2) is satisfied by the chromatic aberration $\Delta fB$ of the composite system including the objective lens and coupling lens with respect to the light flux of the wavelength $\lambda 1$,
wherein a second diffraction structure is formed on an optical surface of the coupling lens through which both the light flux of the wavelength $\lambda 1$ and that of the wavelength $\lambda 2$ pass, and
wherein the following equation (3) is satisfied when d2 denotes the average depth of step structures in the optical axial direction of the second diffraction structure:

$$\lambda 1 \times 2/(n1-1) \times 1.0 \leq d1(\text{nm}) \leq \lambda 1 \times 2/(n1-1) \times 1.3 \quad (1)$$

$$-0.4 \leq \Delta fB(\mu m/nm) + 1.29 \times 10^{-4} \times f1 \times (m2-m1) \leq 0.1 \quad (2)$$

$$\lambda 1 \times 2/(n2-1) \times 1.0 \leq d2(\text{nm}) \leq \lambda 1 \times 2/(n2-1) \times 1.3 \quad (3)$$

where m1 denotes the magnification of the objective lens at the time of recording or reproduction of information using the first optical information recording medium;
f1 indicates the focal distance of the objective lens at the time of recording or reproduction of information using the first optical information recording medium;
m2 shows the magnification of the objective lens at the time of recording or reproduction of information using the second optical information recording medium;
n1 represents the refractive index of the material constituting the first diffraction structure with respect to the light of wavelength $\lambda 1$; and
n2 represents the refractive index of the material constituting the second diffraction structure with respect to the light of wavelength $\lambda 1$.

2. The optical pickup apparatus of claim 1, wherein the following formula is satisfied: $-0.02 < m2-m1 \leq 0$ (4).

3. The optical pickup apparatus of claim 1, wherein the light flux reflected from the information recording surface of the first optical information recording medium and the light flux reflected from the information recording surface of the second optical information recording medium enter the light receiving surface of a common optical detector.

4. The optical pickup apparatus of claim 2, wherein the light flux reflected from the information recording surface of the first optical information recording medium and the light flux reflected from the information recording surface of the second optical information recording medium enter the light receiving surface of a common optical detector.

5. The optical pickup apparatus of claim 1, wherein the following equation is satisfied:

$$-1/6 \leq mG \leq -1/10 \quad (5)$$

wherein mG denotes a magnification of a composite system made up of the objective lens and the coupling lens at the time of information recording or reproduction using the first optical information recording medium.

6. The optical pickup apparatus of claim 2, wherein the following equation is satisfied:

$$-1/6 \leq mG \leq -1/10 \quad (5)$$

wherein mG denotes a magnification of a composite system made up of the objective lens and the coupling lens at the time of information recording or reproduction using the first optical information recording medium.

7. The optical pickup apparatus of claim 3, wherein the following equation is satisfied:

$$-1/6 \leq mG \leq -1/10 \quad (5)$$

wherein mG denotes a magnification of a composite system made up of the objective lens and the coupling lens at the time of information recording or reproduction using the first optical information recording medium.

8. The optical pickup apparatus of claim 1, wherein the first light source and the second light source are accommodated in a common package.

9. The optical pickup apparatus of claim 2, wherein the first light source and the second light source are accommodated in a common package.

10. The optical pickup apparatus of claim 3, wherein the first light source and the second light source are accommodated in a common package.

11. The optical pickup apparatus of claim 5, wherein the first light source and the second light source are accommodated in a common package.

12. The optical pickup apparatus of claim 1, further comprising a third light source for emitting a third light flux having a wavelength λ3 (nm) (λ2<λ3) is provided,
wherein the light converging optical system converges a light flux from the third light source onto an information recording surface of a third optical information recording medium through a protective layer having a thickness t3 (t2<t3), whereby information recording and/or reproduction is enabled.

13. The optical pickup apparatus of claim 2, further comprising a third light source for emitting a third light flux having a wavelength λ3 (nm) (λ2<λ3) is provided,
wherein the light converging optical system converges a light flux from the third light source onto an information recording surface of a third optical information recording medium through a protective layer having a thickness t3 (t2<t3), whereby information recording and/or reproduction is enabled.

14. The optical pickup apparatus of claim 3, further comprising a third light source for emitting a third light flux having a wavelength λ3 (nm) (λ2<λ3) is provided,
wherein the light converging optical system converges a light flux from the third light source onto an information recording surface of a third optical information recording medium through a protective layer having a thickness t3 (t2<t3), whereby information recording and/or reproduction is enabled.

15. The optical pickup apparatus of claim 5, further comprising a third light source for emitting a third light flux having a wavelength λ3 (nm) (λ2<λ3) is provided,
wherein the light converging optical system converges a light flux from the third light source onto an information recording surface of a third optical information recording medium through a protective layer having a thickness t3 (t2<t3), whereby information recording and/or reproduction is enabled.

16. The optical pickup apparatus of claim 8, further comprising a third light source for emitting a third light flux having a wavelength λ3 (nm) (λ2<λ3) is provided,
wherein the light converging optical system converges a light flux from the third light source onto an information recording surface of a third optical information recording medium through a protective layer having a thickness t3 (t2<t3), whereby information recording and/or reproduction is enabled.

17. The optical pickup apparatus of claim 1, wherein the wavelength λ1 and the wavelength λ2 satisfy following equation:

$1.5 < \lambda1/\lambda2 < 1.7.$

* * * * *